US005361087A

United States Patent [19]

Tajima et al.

[11] Patent Number: 5,361,087

[45] Date of Patent: Nov. 1, 1994

[54] LIQUID JET UNIT WITH ORIFICES AND RECORDING APPARATUS USING THE SAME

[75] Inventors: Hiroki Tajima, Yokohama; Kazuaki Masuda, Kawasaki; Takashi Watanabe; Akira Goto, both of Yokohama, all of Japan

[73] Assignee: Canon Kabushiki Kaisha, Tokyo, Japan

[21] Appl. No.: 200,562

[22] Filed: Feb. 22, 1994

Related U.S. Application Data

[63] Continuation of Ser. No. 822,219, Jan. 17, 1992, abandoned.

[30] Foreign Application Priority Data

Jan. 18, 1991 [JP] Japan .................................. 3-004448

[51] Int. Cl.[5] .............................................. G01D 15/18

[52] U.S. Cl. ......................................... 347/44; 347/47

[58] Field of Search ....................... 346/140 R, 1.1, 75; 205/69, 70; 428/680

[56] References Cited

U.S. PATENT DOCUMENTS

| | | | |
|---|---|---|---|
| 4,313,124 | 1/1982 | Hara | 346/140 R |
| 4,337,467 | 6/1982 | Yano | 346/1.1 |
| 4,345,262 | 8/1982 | Shirato et al. | 346/140 R |
| 4,380,018 | 4/1983 | Andoh et al. | 346/140 R |
| 4,459,600 | 7/1984 | Sato et al. | 346/140 R |
| 4,463,359 | 7/1984 | Ayata et al. | 346/1.1 |
| 4,499,480 | 2/1985 | Takatori et al. | 346/140 R |
| 4,558,333 | 12/1985 | Sugitani et al. | 346/140 R |
| 4,678,529 | 7/1987 | Drake et al. | 156/234 |
| 4,723,129 | 2/1988 | Endo et al. | 346/1.1 |
| 4,740,796 | 4/1988 | Endo et al. | 346/1.1 |
| 4,752,787 | 6/1988 | Matsumoto et al. | 346/140 R |
| 4,801,947 | 1/1989 | Lichtenberger et al. | 346/75 |
| 4,829,319 | 5/1989 | Chan et al. | 346/1.1 |
| 5,059,973 | 10/1991 | Wantanabe | 346/1.1 |
| 5,072,240 | 12/1991 | Miyazawa et al. | 346/140 R |

FOREIGN PATENT DOCUMENTS

| | | |
|---|---|---|
| 0367541 | 5/1990 | European Pat. Off. . |
| 0419181 | 3/1991 | European Pat. Off. . |
| 0419190 | 3/1991 | European Pat. Off. . |

*Primary Examiner*—A. T. Grimley
*Assistant Examiner*—Thu A. Dang
*Attorney, Agent, or Firm*—Fitzpatrick, Cella, Harper & Scinto

[57] ABSTRACT

In a liquid jet apparatus with ink discharging orifices and a recording apparatus using the same, each of the orifices has a trapezoidal cross-section, with at least the opposite bottom corners thereof having curved portions. The orifices preferably have a shape convergently tapering toward the outside of the recording head. The orifices are durable against temperature changes, impact, etc., which tend to cause cracking.

25 Claims, 10 Drawing Sheets

LIQUID JET UNIT WITH ORIFICES AND RECORDING APPARATUS USING THE SAME

This application is a continuation of application Ser. No. 07/822,219 filed Jan. 17, 1992, now abandoned.

BACKGROUND OF THE INVENTION

1. Field of the Invention

The present invention relates to an orifice plate itself, defining a plurality of orifices or a liquid jet unit which is integrally provided with the orifice plate and a recording apparatus using the liquid jet unit. The present invention particularly but not exclusively relates to an ink jet head and an ink jet apparatus. In the ink jet head and the ink jet system, an orifice defining member which defines ink orifices is integrally formed with a top or a cap plate for forming liquid passages and a common liquid chamber.

2. Description of the Prior Art

Heretofore, liquid jet systems have bene used in various fields, and among them liquid jet systems for recording have been placed into the market. In the typical conventional methods of forming liquid droplets, there is a bubble forming method by thermal energy which is disclosed in U.S. Pat. Nos. 4,723,129 and 4,740,796. This method is capable of appropriately ejecting droplets in response to recording signals and is hence effective. In another attempt, a piezoelectric transducer was used.

The orifices taught in these publications are formed at a high density and usually have circular cross-sections. The patents disclose that machining is conducted by using a laser for efficiently forming the orifices. In the recording head fabricating methods of these patents, several members, one of which is a grooved plate, are bonded to form orifices at one of the laminated edges or an orifice plate is used to form many orifices. Such a laminated recording head is clearly shown and described in U.S. Pat. No. 4,678,529, in which the orifices and liquid passages communicating to the orifices are formed to have triangular cross-sections.

Conventionally, it was understood that it is optional whether orifices have polygonal or circular cross-sections. Moreover, little attempt was made to pay attention to the cross-sectional shape of the liquid passages. One such attempt is disclosed in U.S. Pat. No. 4,752,787. The known publications teach that orifices are formed at a high density but in practice any recording head which has liquid jet orifices capable of recording at more than 360 dpi has not yet been realized.

In several U.S. applications which have been assigned to Canon Kabushiki Kaisha, the Assignee of the subject application, in view of the prior art the following proposals have been made to effectively provide high density arrangement orifices. 1. An orifice plate and a grooved member for defining liquid passages are molded in one piece. The orifice plate and a substrate are mated in the vicinity of the orifices without using any adhesive. This invention is disclosed in U.S. Ser. No. 07/583,336. The invention is advantageous in that: there is no possibility that the orifice area is changed in shape by an adhesive entering in the orifice area; and the fabrication dispersion of the head is reduced. In addition to the features of the invention, U.S. Ser. No. 07/583,238 teaches that tapering is provided to the common liquid chamber in three directions. 2. A resilient urging member which is arranged to provide pressure in a direction of the arrangement of the orifices to stabilize contact of the mating is disclosed in U.S. Ser. NO. 07/583,168. This urging member holds the orifice area in a stable condition. 3. Grooves which define liquid feed passages are formed to have an equal leg trapezoidal cross-section, and the orifices are formed by a focus-type excimer laser using the grooves for enhancing machining accuracy. This invention is disclosed in U.S. Ser. No. 07/583,335. This laser machining is advantageous in that: each orifice can be formed with a minimum cross-sectional area by forming it from the side of the corresponding liquid passage; and the orifices may be formed in an equal leg trapezoidal cross-section.

These inventions may be effectively applied to the present invention as will be understood from embodiments of the present invention described hereinafter.

Although liquid passages may be polygonal or circular in cross-section, it has been found that orifices preferably have polygonal sides rather than a circular cross-section for improving ejection efficiency of an orifice plate which defines the orifices. This fact is significant for high density orifice arrangement. The inventors have conducted durability tests in which high density orifices of a polygonal cross-section underwent changes in various environmental conditions.

It was however found that during the tests cracks 40 as shown in FIG. 10 were produced before the end of the life of discharging elements, that is, the end of the life of heads. These cracks were produced from the front side of the orifice plate but the reason for the production of the cracks was not clear. It was considered that the cracks were peculiarly produced. Further study revealed that the more complicated the duration test became the more cracks were produced. Such a test included rapid temperature changes and excessive continuous ejection in low temperature environments. Cracks were found in part of heads either. These heads had undergone a drop test after a duration test which had produced no significant cracks, or had been subjected to a duration test after a drop test which had provided no problem as to cracks. Heretofore, no attention was paid to these phenomena. The inventors have studied causes of this problem, and thereby have completed the present invention which solves the problem.

SUMMARY OF THE INVENTION

Accordingly, it is a principal object of the present invention to solve the novel problem previously mentioned and to provide a liquid jet unit which is excellent in durability and an orifice defining member used for the liquid jet unit.

Another object of the present invention is to provide a liquid jet unit which is capable of achieving appropriate liquid ejection and expanding the use thereof by giving appropriate conditions and a structure to causes which produce the problems above.

Still another object of the present invention is to provide a liquid jet unit which is capable of achieving excellent liquid ejection while satisfying requirements in both durability and ejection efficiency by reducing crack is produced. This object is achieved by applying effective conditions to a high density orifice construction.

It is another object of the present invention to provide a recording apparatus for conducting recording, using a liquid jet unit which meets and satisfies each of the preceding objects.

It is still another object of the present invention to provide a liquid jet unit which is capable of solving the problems previously mentioned while possessing the advantage of polygonal orifices in cross-section which have liner sides.

Other objects will be understood from the explanation hereinafter.

In the first aspect of the present invention, a liquid jet unit comprises:

a plurality of discharging portions each having a substantially polygonal orifice in cross-section with outer and inner openings and a liquid passage communicating to the orifice, a plurality of discharging portions have a member made of a non-metallic material which defines at least two sides of each of the polygonal orifices, the member having a curved portion at a position corresponding to a corner of the polygonal orifice at least on the side of the outer opening; and ejection elements for supplying ejection energy to liquid contained in the liquid passages to eject liquid through the orifices.

Here, the orifice defining member may comprise a covering member forming at least a part of the respective liquid passages, the covering member and the orifice defining member being molded of a resin in one piece thereby constructing a resin member.

A liquid jet unit may further comprise a supporting member having the ejection elements thereon, and the resin member may comprise an engaging portion formed adjacent to the orifices on the side of the supporting member for engaging with the supporting member and the curved portion on the side of the engaging portion.

A liquid jet unit may further comprise pressing means for resiliently holding the orifice defining member and the supporting member into engagement to each other, and wherein the ejection elements are electrothermal converting-elements for generating film boiling in the liquid; and the resin member and the supporting member are bonded to each other at a location away from the engaging portion.

The curved portion may have a radius of curvature 2 μm to 12 μm.

Here, the resin member may have a thickness of 60 μm at the largest at a position thereof where the orifices are formed;

each of the orifice has an area 200 $\mu m^2$ to 450 $\mu m^2$;

the radius of curvature of the curved portion is 4 μm to 9 μm; and the orifices may be arranged for performing recording at least 400 dpi.

The engaging portion may have a length 10 μm at the smallest in a liquid ejection direction of the orifices.

In the second aspect of the present invention, a liquid jet unit comprises:

a plurality of discharging portions each having a substantially polygonal orifice in cross-section with outer and inner openings and a liquid passage communicating to the orifice, a plurality of discharging portions having a member made of a resin material which defines at least two sides of each of the polygonal orifices, the member having a curved portion having a radius of curvature 2 μm to 12 μm at a position corresponding to a corner of the polygonal orifice on the side of the outer opening; and ejection elements for supplying ejection energy to liquid contained in the liquid passages to eject liquid through the orifices.

Here, the member may have a thickness of 60 μm at the largest at a position thereof where the orifices are formed; and the curved portion of each of the orifices may be continuously increased in radius of curvature from the side of the outer opening toward the liquid passages.

A liquid jet unit may further comprise a supporting member having the ejection elements thereon, and the resin member may comprise an engaging portion formed adjacent to the orifices on the side of the supporting member for engaging with the supporting member; and the curved portion having a radius of curvature 4 μm on the smallest on the side of the engaging portion.

The engaging portion may have a length 10 μm at the smallest in a liquid ejection direction of the orifices.

The ejection elements may be electrothermal converting-elements for generating film boiling in the liquid; and the resin member and the supporting member may be bonded to each other at a location away from the engaging portion.

The ejection elements may be electrothermal converting-elements for generating film boiling in the liquid; and the orifices may be arranged for recording at least 400 dpi.

Here, the member may further define walls forming recesses corresponding to liquid passages communicating to the orifices;

the member may have a thickness of 60 μm at the largest at a position thereof where the orifices are formed;

the curved portion of each of the orifices may be continuously increased in radius of curvature from the side of the outer opening toward the liquid passages; and the curved portion may have a radius of curvature 8 μm to 16 μm on the side of liquid passages.

In the third aspect of the present invention, an orifice defining member for a liquid jet unit may be made of a resin material in the shape of a single piece, the orifice defining member defining at least two sides of each of substantially polygonal orifices having outer and inner openings and walls forming recesses corresponding to liquid passages communicating to the orifices, respectively;

the orifices defining member may have a curved portion having a radius of curvature 2 μm to 12 μm at a position corresponding to a corner of the polygonal orifice on the side of the outer opening;

the orifice defining member may have a thickness of 60 μm at the largest at a position thereof where the orifices are formed; and the orifices may be formed to continuously increase in radius of curvature toward the corresponding liquid supply passage.

Here, the radius of curvature may be 8 μm to 16 μm on the side of the liquid supply passages.

In the fourth aspect of the present invention, a liquid jet recording apparatus comprises:

a liquid jet unit which comprises:

a plurality of discharging portions each having a substantially polygonal orifice in cross-section with outer and inner openings and a liquid passage communicating to the orifices, a plurality of discharging portions having a member made of a resin material which defines at least two sides of each of the polygonal orifices, the member having a curved portion having a radius of curvature 2 μm to 12 μm at a position corresponding to a corner of the polygonal orifice on the side of the outer opening, the curved portion of each of the orifices being continuously increased in radius of curvature from the side of the outer opening toward the corresponding liquid supply passage, electrothermal converting-elements for generating film boiling in liquid contained in respective liquid supply passage, and the orifices being arranged for recording at least 400 dpi;

a transporting mechanism for transporting a recording medium on which recording is carried out using ejected liquid; and drive means for supplying drive signals to the electrothermal converting-elements in response to a recording signal.

A liquid jet recording apparatus may further comprise a supporting member having the electrothermal converting-elements thereon, and wherein the resin member comprises an engaging portion formed adjacent to the orifices on the side of the supporting member, and the resin member and the supporting member may be bonded to each other at a location away from the engaging portion.

The member may further define walls forming recesses corresponding to the liquid passages communicating to the orifices, respectively;

the member may have a thickness of 60 μm at the largest at a position thereof where the orifices are formed; and the radius of curvature of the curved portion may be 8 μm to 16 μm on the side of liquid passages.

In the fifth aspect of the present invention, an ink jet head in which an orifice defining member and a top plate are integrally molded of a resin material, the orifice defining member having a plurality of ink discharging orifices formed therethrough, and the top plate having groove portions defining respective liquid passages for ejecting ink through the ink discharging orifices; and the ink orifices are formed through the orifice defining member by a laser beam from the side of the liquid passages, characterized in that the ink orifices are tapered from the side of the liquid passages toward the outside thereof, the ink orifices having corners opposite including bottom corners, at least the bottom corners each having a curved surface.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
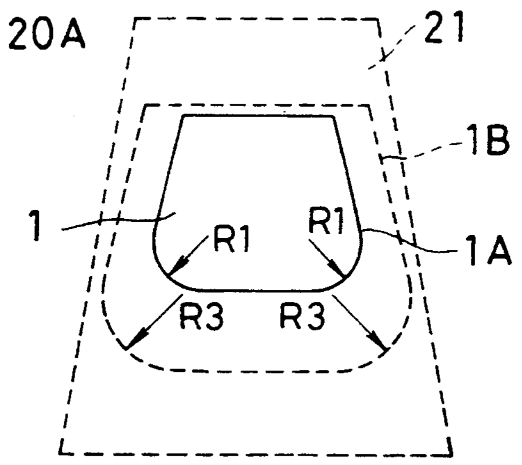
FIG. 1 is an enlarged front view showing one example of the shape of an ink jet orifice used in an ink jet head according to the present invention.

Referring to the drawings, the invention will be explained in detail according to the following fabrication steps of an ink jet head: liquid passages and common liquid chamber are formed as grooves in a top on a cap plate; through holes are formed through an orifice defining member by a laser beam to provide orifices; the top plate thus produced is bonded to a substrate on which energy transducer elements, such as electrothermal converting-elements, electrodes thereof, etc are formed; and the common liquid chamber is provided with an ink supply port.

Figure 6:
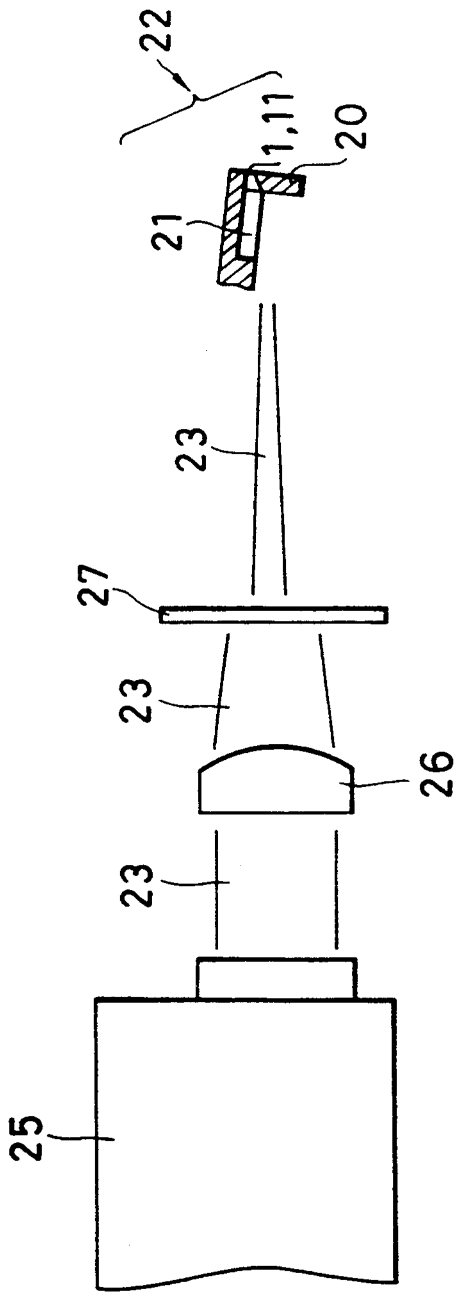
FIG. 6 is an illustration of an ink jet orifice forming unit using a laser beam.
Figure 7:
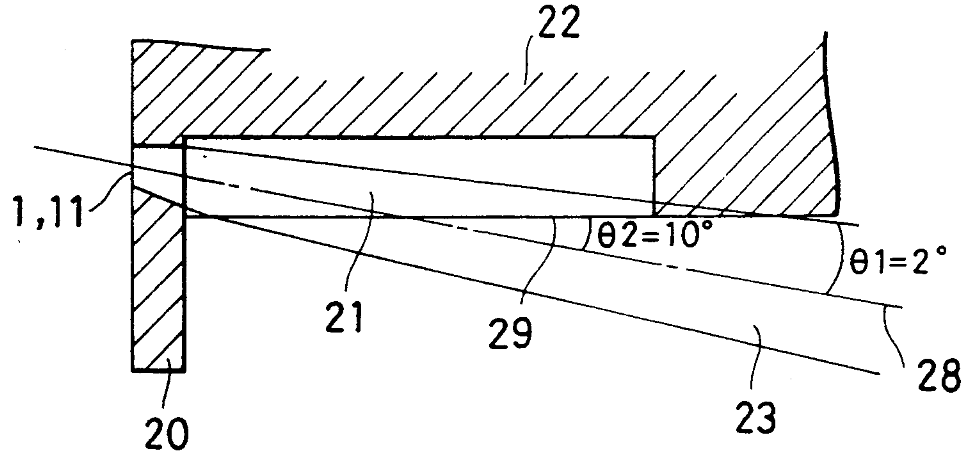
FIG. 7 is an illustration of how to form an ink jet orifice by a laser beam.

FIGS. 6 and 7 illustrate an apparatus and an operation of forming through holes 1 (11) through a top plate 22, using a laser beam 23. The top plate 22 is integrally formed with an orifice defining member 20, and has grooves 21 as liquid passages. In FIG. 6, reference numeral 25 designates a laser oscillation unit which oscillates a KrF excimalaser beam, 26 a synthetic quartz lens, and 27 a projection mask having aluminum or like substance vapor deposited on it for shielding the laser beam 23. The mask 27 is provided with light passing holes corresponding in pitch to through holes (11) forming ink jet orifices.

The top plate 22 is molded together with the orifice defining member 20 in one piece by means of a mold, using a resin excellent in ink resistance. The resin may include polysulfon, polyethersulfon, polyphenylene oxide and polypropylene. The grooves 21 are formed simultaneously by means of the mold. An excimalaser beam 23 is irradiated against the top plate 22 thus molded form the inside of the orifice defining member 20 through the mask 27. Then, a convergently tapered through hole or an orifice 1 (11) is formed through the orifice defining member 20 as shown in FIG. 7. In FIG. 7, reference numeral 28 designated an optical axis of the laser beam 23. The laser beam 23 is irradiated with the optical axis 28 inclined $\theta_2 = 10°$, for example, to the substrate joining plane 29 of the top plate 22. The laser beam 23 is focused $\theta = 2°$.

Figure 8:
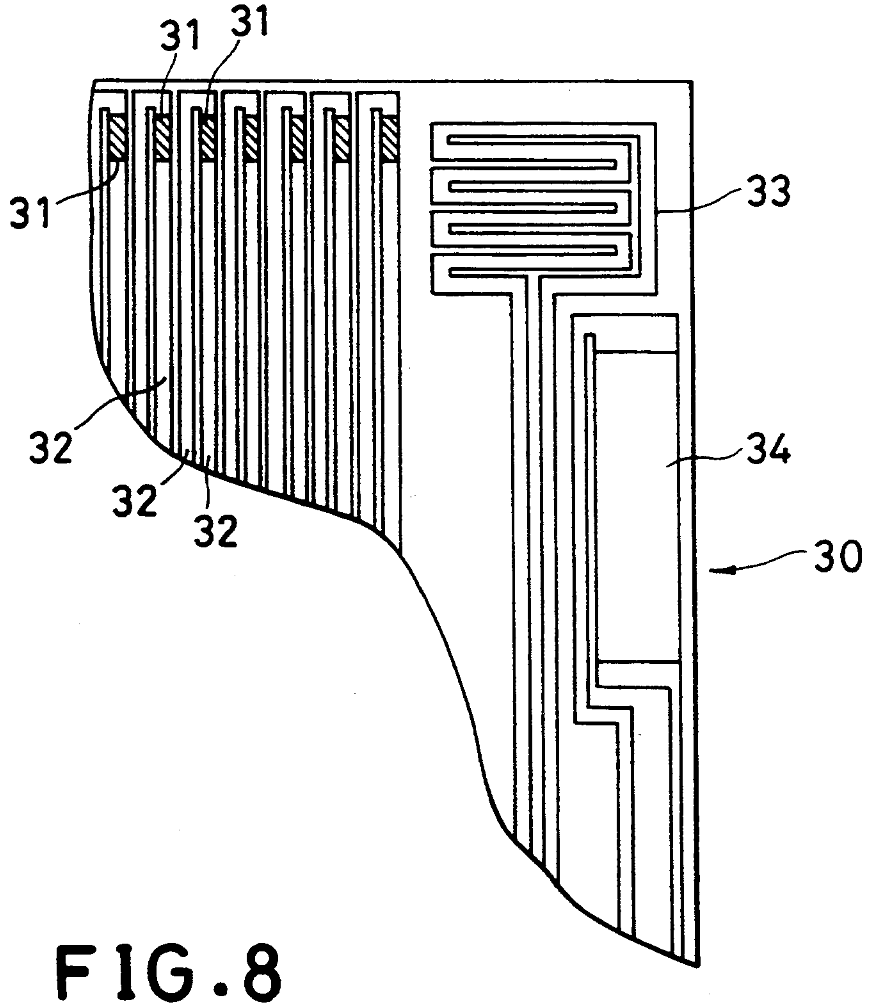
FIG. 8 is an enlarged plan view of the heater board used in the ink jet heads of FIGS. 2 and 4.

FIG. 8 illustrates a part of a substrate (referred to as a heater board hereinafter) 30 which is joined to the substrate joining plane 29 of the top plate 22. In FIG. 8, reference numeral 31 indicates electrothermal transducers provided corresponding to each of the liquid passages, 32 wirings of the electrothermal transducers, 33 a temperature sensor portion for detecting the temperature of the substrate 30, and 34 a heater.

Figure 9:
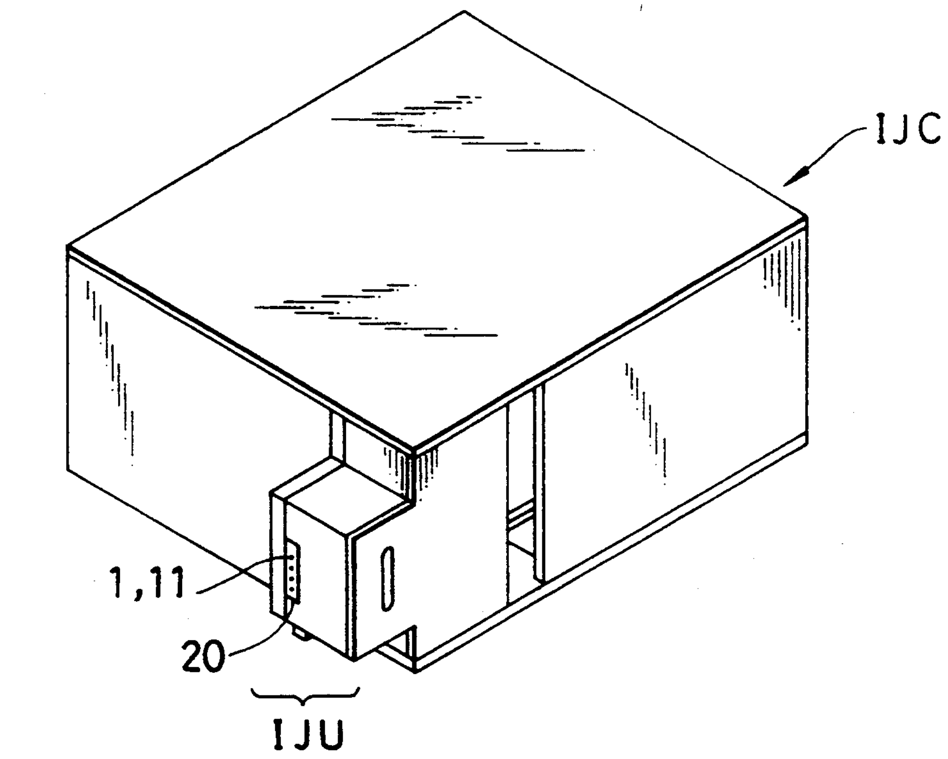
FIG. 9 is a perspective view of an ink jet head unit using the ink jet head of FIG. 2 or 4.

The top plate 22 thus constructed is integrally joined to the heater board 30, and is then incorporated as an ink jet head unit IJU into an ink jet head cartridge IJC as shown in FIG. 9. In this case, ink is fed from an ink tank (not shown) provided within the ink jet head cartridge IJC, and ink is ejected or discharged from outer opening of the orifice 1 (11) of the ink jet head.

The convergently tapered orifices 1 (11) which gives a stable ejection speed to ink may be formed in the ink jet head constructed according to the steps previously mentioned by irradiating a laser beam 23 in a fashion as shown in FIGS. 6 and 7. Moreover, a sufficient amount of discharged ink can be secured by substantially forming the orifices in a rectangular cross-section (in practice in a trapezoidal cross-section as shown in FIG. 1 since the optical axis is not perpendicular to the orifice defining member 20). This provides a god recording density.

As the laser, an excimalaser, which is capable of oscillating ultraviolet light, is preferably used in the invention. The excimalaser has an advantage in that energy density can be greatly enlarged since it has a high intensity, good monochromaticity, and directivity, and is capable of short pulse oscillation.

The excimalaser oscillator is capable of oscillating a short pulse (15–35 ms) of ultraviolet light by discharge exiting a gas mixture of a rare gas and a halogen gas. As the excimalaser, Kr-F, Xe-Cl and Ar-F lasers are often used, and the oscillation energy and pulse repetition cycle thereof are several hundreds mJ/pulse and 30–100 Hz, respectively.

When high intensity short pulse ultraviolet light of such an excimalaser beam is irradiated against a polymer surface, an ablative photodecomposition (APD) process is generated in which the irradiated portion is instantaneously decomposed and scattered with plasma emission and an impact noise. This process enables drilling of the polymer.

A comparison in machining accuracy between the excimalaser and other lasers, for example, a comparison in machining of a polyimide (PI) film between KrF laser as excimalaser, and YAG laser or $CO_2$ laser as other lasers reveals that KrF laser can form a clear hole as the wavelength thereof which absorbs light of polyimide is in an ultraviolet region, whereas the YAG laser and CO2 laser cannot make any clear hole. YAG laser which is not in an ultraviolet region makes a hole with a rough edge and CO2 laser produces carters around the hole.

As the mask material for use in machining by excimalaser a metal such as stainless steel, an opaque ceramic, silicon and the like may be used since they are not influenced by irradiation of excimalaser in the atmosphere.

A case where an orifice is formed through an orifice defining member 20, made of a polymer, by a system as shown in FIG. 6 using an excimalaser oscillator 25 will be described. FIG. 1 illustrates one example of the shapes of inner and outer openings of the orifice 1 formed through the orifice defining member 20. Reference number 1A designates the shape of the outer opening of the orifice 1 on the side of the ink ejection plane 20A whereas 1B the inner opening of the orifice 1 on the side of the liquid passage groove 21. The opposite openings 1A and 1B are substantially equal leg trapezoidal, and are similar in shape to each other. Although the outer opening 1A is a trapezoidal, it has curved or round portions with a radius or curvature R1 at respective positions corresponding to opposite bottom corners of the trapezoid. Also the mask used for forming orifices 1 has a similar opening having opposite curved bottom corners. For this reason, the inner opening 1B of the orifice 1 has opposite curved or round portions with a radius of curvature R3. $R1 < R3$.

Figure 10:
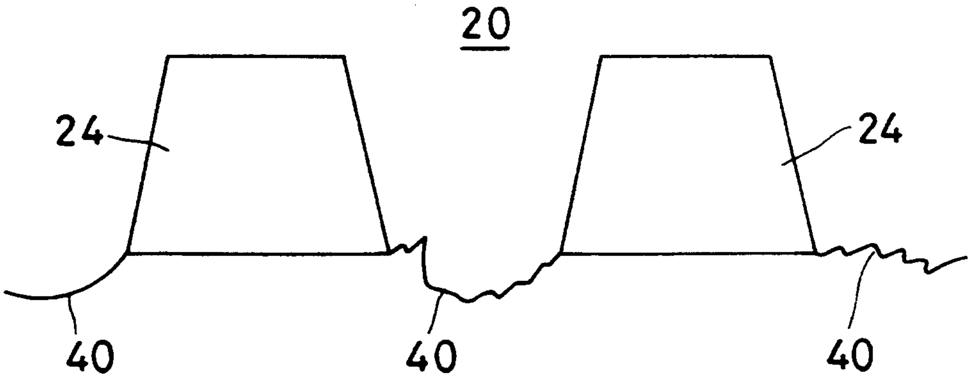
FIG.10 (PRIOR ART)
FIG. 10 is a front view showing shapes of conventional ink jet orifices to explain problems to be solved by the present invention.

As previously mentioned, in the orifice plate in which cracks are found, cracks are, as shown in FIG. 10, produced in the closest areas between adjacent orifices. For this reason, in the embodiment of FIG. 1 the substantially closest areas between polygons have no angular corner portions but substantially curved or chamfered portions. The orifice defining member has therefore sufficient strength against excess loads such as environmental changes and impact. According to the embodiment, the opposite corners of at least the bottom of each outer opening of the orifice substantially having an equal leg trapezoidal shape are curved with a curvature radius R, and thereby the stress concentration portions which are liable to be damaged by repeated temperature changes and impacts due to cutoff effect are enhanced in strength. Preferably, the ink jet orifices are tapered convergently toward the outside so that accurate discharge direction and discharge speed can be provided to discharged ink. Moreover, the ink jet head of the embodiment is capable of securing sufficient amount of discharged ink by forming the orifices in a polygonal cross-section.

Figure 2:
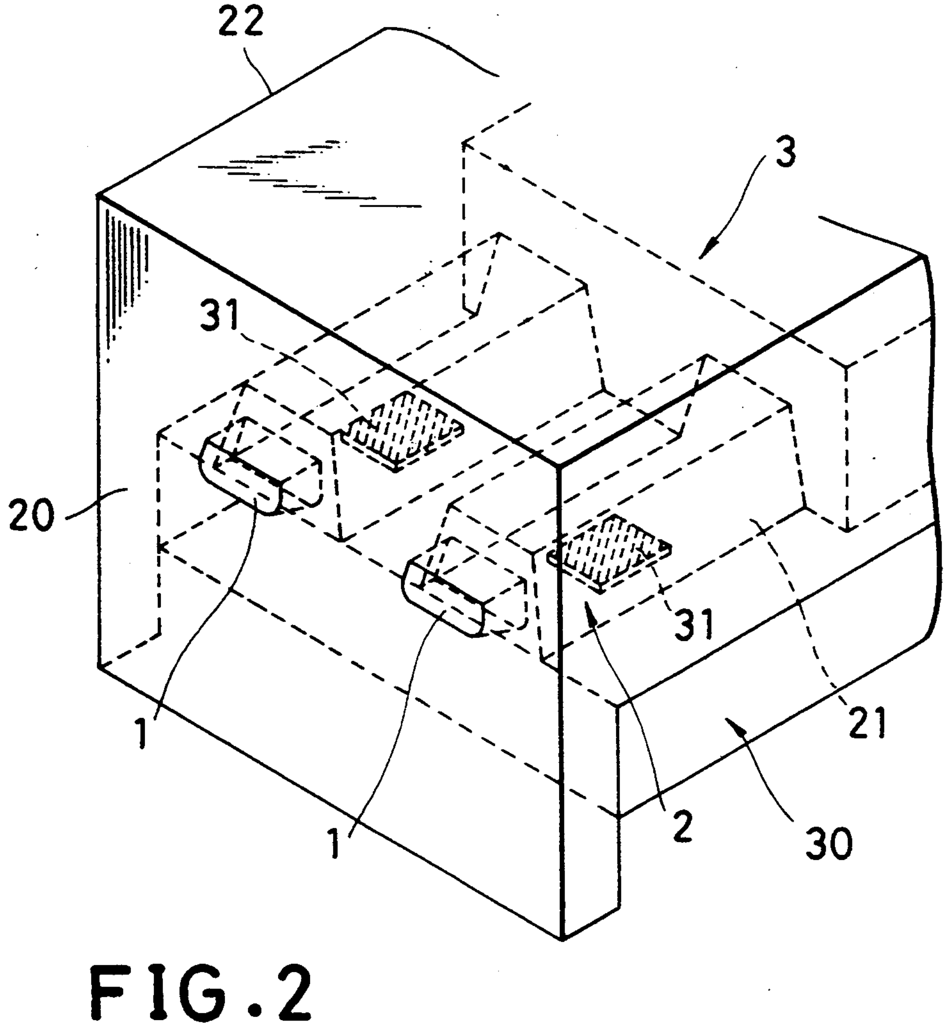
FIG. 2 is a perspective view of the ink jet head with the ink jet orifices of FIG. 1.

FIG. 2 illustrates a construction of an ink jet head in which the to plate 22 is bonded to the heater board 30 provided with electrothermal converting-elements as ejection elements. The top plate 22 has the orifice defining member 20 molded in one piece with it as previously explained with reference to FIGS. 6 and 7. The top plate 22 is provided with orifices 1. As a result of such assembling liquid passages 2 are defined by the upper surface of the heater board 30 and the grooves 21 previously formed in the top plate 22. Furthermore, a common liquid chamber 3 is formed. In FIG. 2 only two orifice portions which each include the orifice and the liquid passage are shown but more than two orifice or discharging portions may be provided. No cracks previously mentioned have been found even in more than 400 dpi high density arrangement.

In the electrothermal converting-elements of this embodiment, film boiling is produced in the liquid, and ejection responsibility of droplets to supplied driving signals is very excellent. This advantage might cause cracks previously mentioned to be produced. More specifically, thermal energy repeatedly supplied provides rapid temperature rises of 300° C. or larger to the liquid. The orifices are therefore subjected to both cooling by the surrounding air and heating by passage of high temperature liquid, and must withstand against repeated changes in temperature. The lower the environmental temperature drops, the larger durability this phenomenon requires. According to this embodiment, the orifice portions are enhanced in durability against high frequency repeated drive due to thermal energy since the orifice portions are provided with reinforced portions including the curved portions and the straight portions. In other words, the ink jet head of this embodiment is capable of securing durability, placing the liquid discharging state, generated by using thermal energy, in a more stable state, and hence the ink jet head has extended application fields.

EXAMPLE 1 AND COMPARATIVE TEST 1

The advantageous effects of this embodiment will be fully understood by the following examples and comparative test 1. A cycle test was conducted and during the 8 hour, duration of each cycle, samples were placed for two hours at each of temperatures of −30° C., normal temperature, 60° C. and normal temperature. The samples underwent 3 cycle tests for 24 hours in total. Each of the orifices had a trapezoidal basic shape with an 18 μm long upper side, a 25 μm long lower side and an 18 μm height. The radius of curvature R varied among samples. The samples were identical in structure to the ink jet head of FIGS. 1 and 2. The duration test was conducted by changing radius curvature R1 of the corners of the 1A outer opening orifice as shown in Table 1.

The outcome of the test is given in Table 1, in which: x indicates that unacceptable cracks were produced; Δ designates acceptable; and o good.

TABLE 1

| Samples | Radius of Curvature R1 (μm) | Judgement |
|---|---|---|
| 1 | No curved corner (prior art) | x |
| 2 | 2 | Δ |
| 3 | 5 | Δ |
| 4 | 8 | o |
| 5 | 10 | o |
| 6 | 12 | o |

From the results it is apparent that the radius of curvature R1 must be 2 μm or larger, and that the overall shape of the orifices may be substantially polygonal in cross-section with enhanced discharging efficiency. The radius of curvature 12 μm is an upper limit which is effective value for the substantially polygonal orifices to perform stable high density recording as a recording apparatus and to enhance discharging efficiency. It is to be noted that among samples with orifices having corners with 1 μm radius of curvature there were samples which had no sufficient curved portion due to scattering in orifice fabrication. Thus, the lower limit of the radius of curvature is preferably 2 μm or larger.

In the case where metallic material is used for an orifice defining member (called orifice plate), orifices may be formed by punching as well as in the case of using non-metallic material orifices may be formed by laser machining previously mentioned. In the case of punching, strains remain in corners of the polygonal walls of the orifices due to stress concentration of the punching, and cracks may be produced during use. In this case, curved portions are preferably formed in all the inflection portions or corners of the polygonal orifices. It is possible to prevent stress concentration from being produced by providing curved portions to the inflection portions. In order to enhance discharging efficiency, it is effective to reduce the inflection portions in radius of curvature. To reduce the radius of curvature to 8 μm or smaller, the orifice defining member and the liquid passage defining member may be, as in the embodiment, molded in one piece for dispersing stresses to enhance mechanical strength or most of (preferably all the) inflection portions of each of the polygonal orifices may be provided with curved portions previously described.

A modified form of the substantially equal leg trapezoidal orifices of FIGS. 1 and 2 will be described with reference to FIGS. 3 and 4. The modified orifices are capable of reducing the radius R1 or enhancing durability thereof. The head with the modified orifices is rather stronger against excessive change in temperature and excessive impact than the head with the orifices of FIGS. 1 and 2. The essential portions of the head of FIGS. 3 and 4 will be explained, and explanation of other portions thereof similar to those of the head of FIGS. 1 and 2 is omitted.

Figure 3:
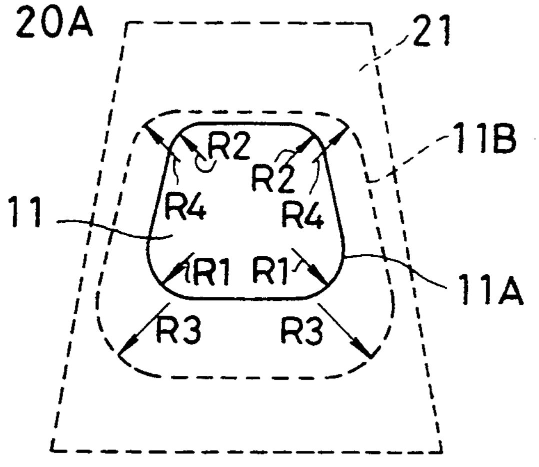
FIG. 3 is an enlarged front view showing a modified shape of the ink jet orifice of FIG. 1.
Figure 4:
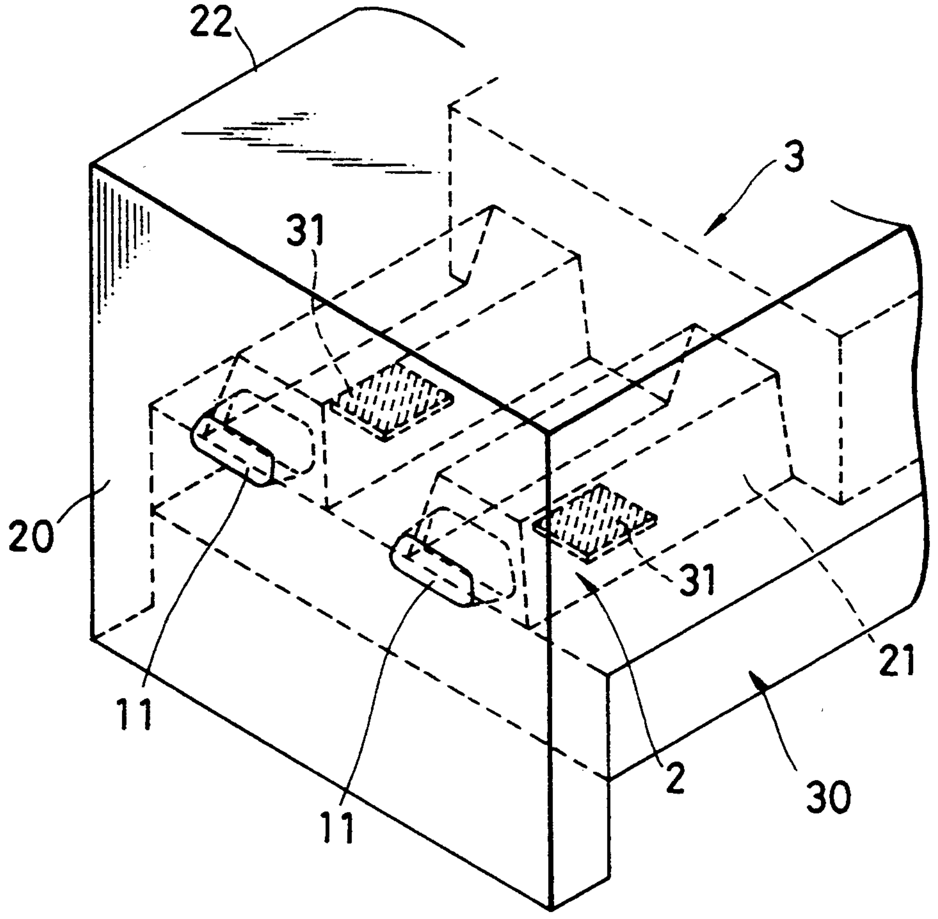
FIG. 4 is a perspective view of an ink jet head with the ink jet orifices of FIG. 3.

In FIGS. 3 and 4, the substantially trapezoidal orifices are provided in upper corners thereof with curved portions having radius of curvature R2 in addition to the lower curved corners (radius of curvature R1). In a though hole 11 forming each orifice, the outer opening 11A on the side of the face of discharging orifice 20A is similar in shape to the inner opening 11B on the side of the corresponding liquid passage groove 21; that is, R2: R4 = R1 : R3. An ink jet head having a top plate 22 provided with the through holes or orifices 11 of FIG. 3 is illustrated in FIG. 4. The ink jet head thus constructed is sufficient in strength around the through holes 11, and hence excellent recording is achieved without produced little cracks in the corners of the through holes 11.

As clearly shown in FIGS. 3 and 4, the orifice 11 is continuously and monotonically reduced in cross-section from the inner opening 11B to the outer opening 11A, and satisfies conditions that R4 > R2 and R3 > R1. Since curved corners are provided to the substantially frustopyramidal orifice 11 in such a fashion, stress dispersion is enhanced, and ejection of liquid discharged through the orifice 11 exhibits improved stability of discharging direction. However, according to the present invention the inner and outer openings 11B and 11A may be identical in shape with R4 = R2 and R3 = R1.

In FIG. 3, the radius of curvature R1 (R3) of one pair of corners of the outer opening 11A (11B) may be larger than the radius of curvature R2 (R4) of the other pair of corners. Any considerable difference in flow resistance between corner portions can give an unstable factor to liquid ejection which is adopted in recording. From this point it is preferable for recording that R2 = R1 and R3 = R4. From the point of durability it is most preferable to make all the corners of the orifice equal in radius of curvature (R2 = R1 in FIG. 3) since stresses can be further dispersed.

To obtain referable numerical conditions of the orifice 11 shown in FIG. 3 experiments were conducted. In the samples, orifices were arranged substantially linearly for high density recording at 400 dpi or higher; the pitch of the orifices was 63.5 μm; the closest distance between adjacent orifices was 12 μm; and every portion of each orifice is the same in radius of curvature, that is, R1 = R2. The experiments were conducted on the same conditions as the previous experiments.

Table 2 gives the results of the experiments. In Table 2, the production of cracks is indicated as follows: N indicates no cracks produced; o little cracks produced; Δ acceptable cracks produced; and x unacceptable cracks produced. The ejection characteristic was judged in view of emission efficiency and scattering of emission direction for predetermined emission drive conditions, and o designates excellent characteristic, Δ acceptable characteristic, and x unacceptable characteristic. In the evaluation, A indicates excellent, B very good, B' good, C acceptable and x unacceptable. The comparative test 2 was conducted on the same conditions except that the orifices 11 were provided with acute corners instead of curved corners.

TABLE 2

| Radius Curvature (μm) | 2 | 3 | 4 | 5 | 6 | 7 | 8 | 9 | 10 | 11 | 12 | Comparative Test (No curved corner) |
|---|---|---|---|---|---|---|---|---|---|---|---|---|
| Cracks Produced | Δ | ◦ | N | N | N | N | N | N | N | N | N | X |
| Ejection Characteristics | ◦ | ◦ | ◦ | ◦ | ◦ | ◦ | ◦ | ◦ | Δ | Δ | Δ | X |
| Evaluation | C | B' | A | A | A | A | A | A | B | B | B | X |

From Table 2, it is apparent that for every radius of curvature the ink jet heads achieved performance superior to those of the ink jet heads shown in Table 1 except that for the radius of curvature of 2 μm the same results were obtained. From these results, practically acceptable radius of curvature of the curved corners was 2 μm to 12 μm in view of production of cracks in orifices at 400 dpi or higher. The optimal radius of curvature was 4 μm to 9 μm.

In the case where a separate orifice plate is used as an orifice defining member, it is preferable that an ink jet head is formed under the conditions of Table 2 and R1 = R2 = R3 = R4 in FIG. 3 if no reinforcement is made. When reinforcement is made by molding the orifice defining member 20 together with the top plate 22 in one piece as in FIG. 4, the conditions of radii R3 and R4 are loosened. From a point of enhancing discharging efficiency, radii R3 and R4 are preferably 8 μm to 16 μm.

Figure 5:
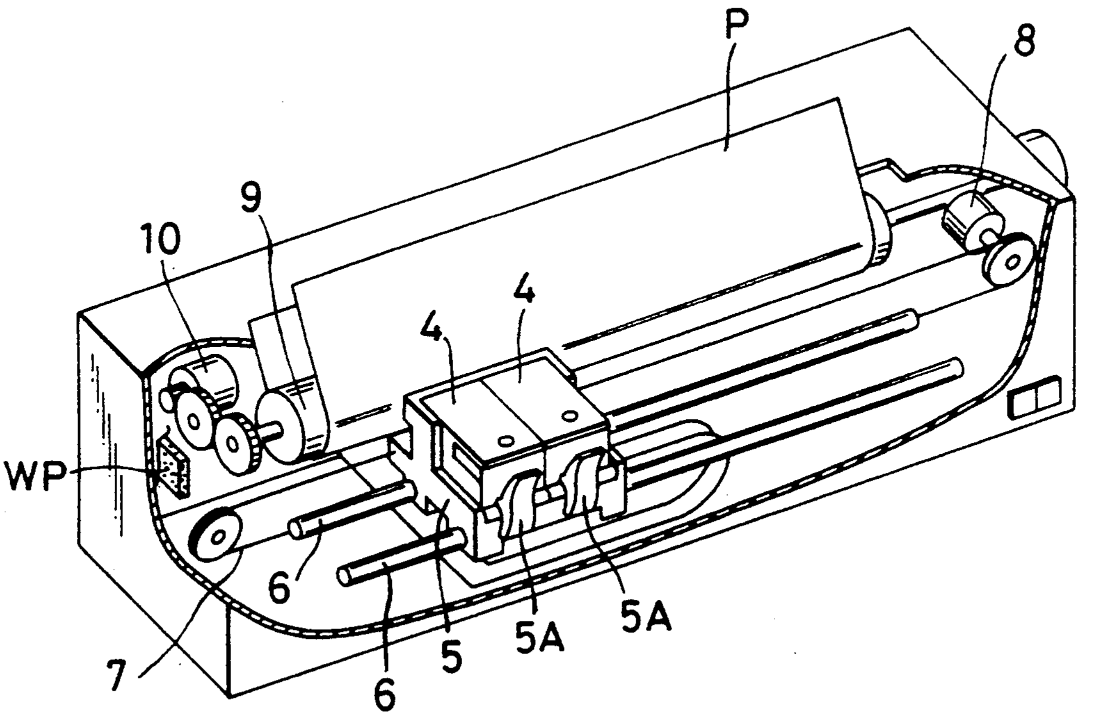
FIG. 5 is a perspective view of an ink jet printing apparatus constructed according to the present invention.

FIG. 5 illustrates an ink jet apparatus in which the liquid jet unit is used. In FIG. 5, reference numeral 4 indicates a replaceable ink jet head cartridge which is united the liquid jet unit to an ink tank not shown and is detachable to a carriage 5. In this embodiment, two cartridges 4 containing different kinds of ink are mounted to the carriage 5 through holding members 5A and 5A. Reference numeral 6 designates a guide shaft for the carriage 5, 7 a drive wire connected to the carriage 5, 8 a drive motor for the wire 7, 9 a platen for holding a sheet P, and 10 a sheet feed motor for driving the platen 9. Reference characters WP indicate a wiper as a cleaning member for cleaning the orifice plane. The wiper WP makes cleaning of the face of the discharging portion periodically or according to need. The liquid jet units which meet requirements of any one of the preceding embodiments did not deteriorate in durability when impact was applied to them by the wiper WP. It should be noted that in polygonal orifices arranged at 400 dpi or more and having curved corners, cracks excessively increased.

In the ink jet apparatus, a connector (not shown) on the carriage 5 is connected to a wiring board (also not shown) mounted on the cartridge 4, when the cartridge 4 is mounted on the carriage 5, and thereby electric signals may be selectively supplied to the electrothermal converting-elements 31 mounted on respective liquid passage 2. During traveling of the carriage 5 by the drive motor 8 along the guide rods 6 and 6, ink is selectively ejected from ink orifices (FIGS. 2 and 4) of the ink jet head incorporated into the cartridge 4 at the timing of the travel, so that recording is achieved on the sheet P. For each scanning, the sheet P on the platen 9 is fed by a width of the recording by the sheet feed motor 10.

Although in the preceding embodiment, the basic cross-section of each ink orifice is trapezoidal, the present invention may be applied to an orifice having rectangular basic cross-section.

Figure 11:
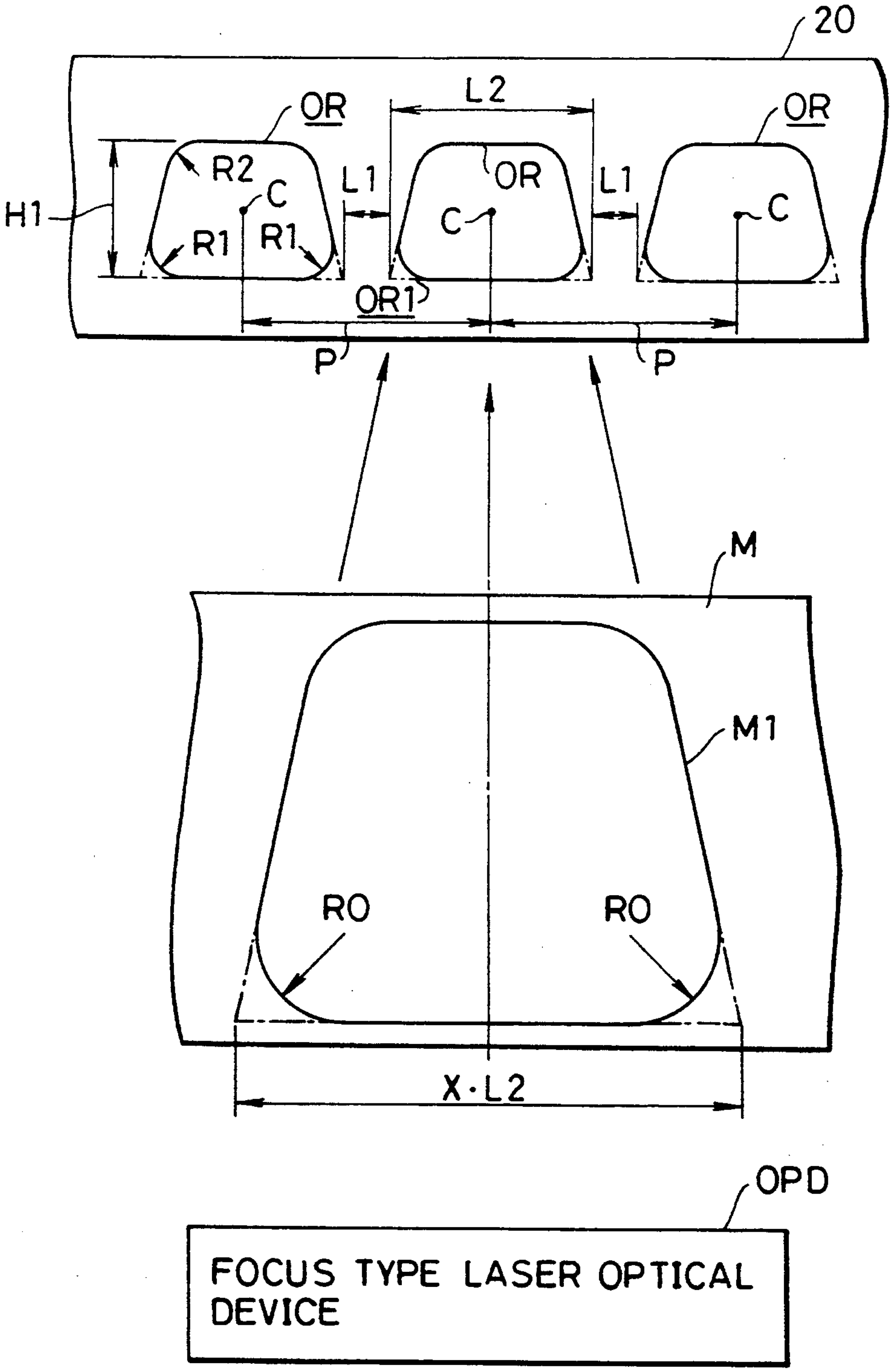
FIG. 11 is an illustration showing a concept of focus type laser drilling according to the present invention.

FIG. 11 shows one of laser beam passing apertures M1 of the mask M which is used in an optical system using excimalaser as a focus type optical device OpD (using a lens). Reference numeral 20 indicates an orifice defining member made of a resin, and openings, having the same shape, of only the adjacent 3 orifices OR are illustrated for simplifying explanation.

In FIG. 11, reference characters L1 and L2 are given based on the shape corresponding to a polygonal orifice OR1 and a passing aperture M1, which does not have curved corners, and indicate distances between positions corresponding to angular corners of polygon according to this invention. L1 indicates the shortest distance between adjacent polygonal orifices, shown by the dot-and-dash line, and L2 indicates the length of the base side of each polygonal orifice. That is, FIG. 11 shows that supposing that the length of the imaginary base, indicated by the dot-and-dash line, of each of the polygonal laser beam passing apertures M1 is xL2, the laser beam passing aperture M1 of the mask M is reduced to the corresponding orifice OR at a ratio 1/x. The focus type laser optical system is effective in that orifices having a size according to a reduction ratio are substantially produced, and is advantageous in that the walls of the orifices are smooth and the orifices are reduced in cross-section toward ejection or outer openings. Reference character C designates the center of each orifice, and the distance between centers of adjacent orifices is equal to the pitch P. The pitch P and radius of curvature R1 and R2 of each of curved portions of the orifices OR are substantially provided at a reduction ratio 1/x to those of the laser beam passing aperture M1. The reason why the reduction ratio is substantially 1/x is that according to some kinds of resin material, the reduction ratio can be smaller than 1/x.

Figure 12:
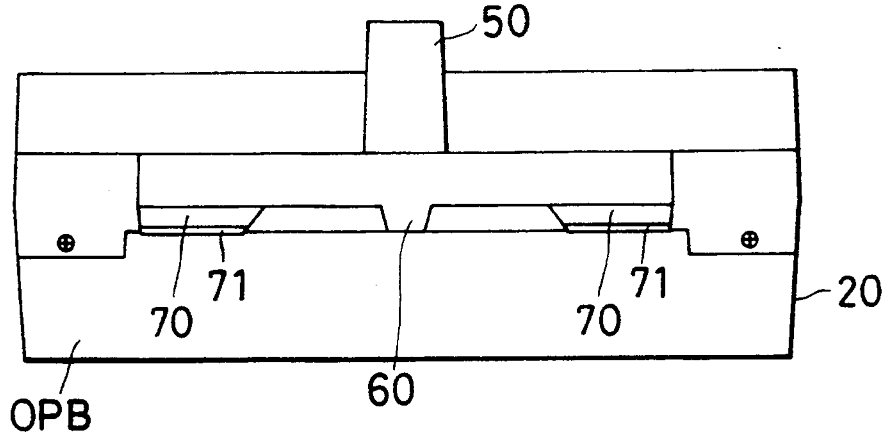
FIGS. 12 to 14 are a rear view, a bottom view, and a front view of an orifice defining member, respectively, according to the present invention.
Figure 13:
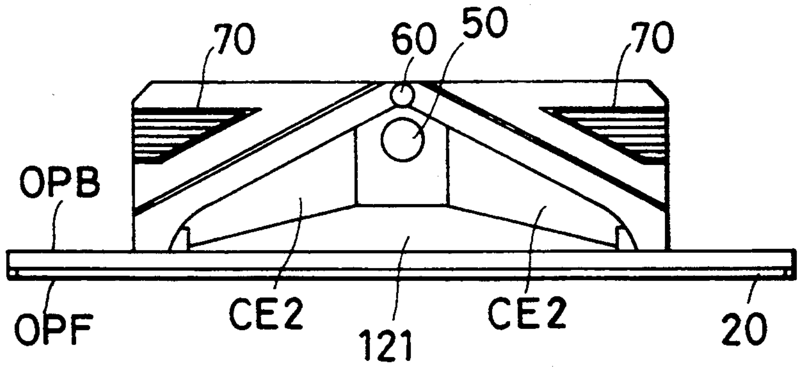
Figure 14:
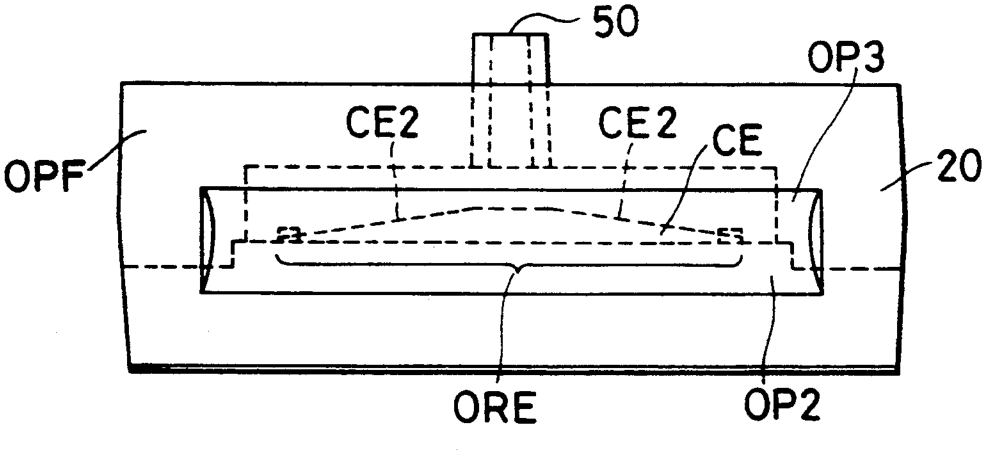
Figure 15:
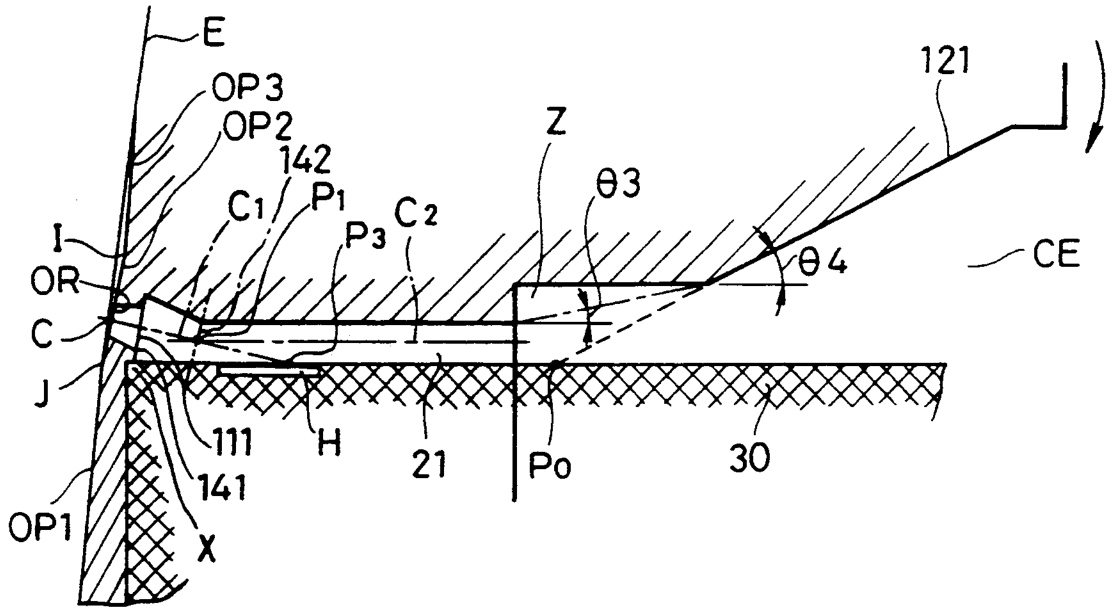
FIG. 15 is a sectional view taken along a liquid passage of a liquid jet unit using the orifice defining member of FIGS. 12 to 14.
Figure 16:
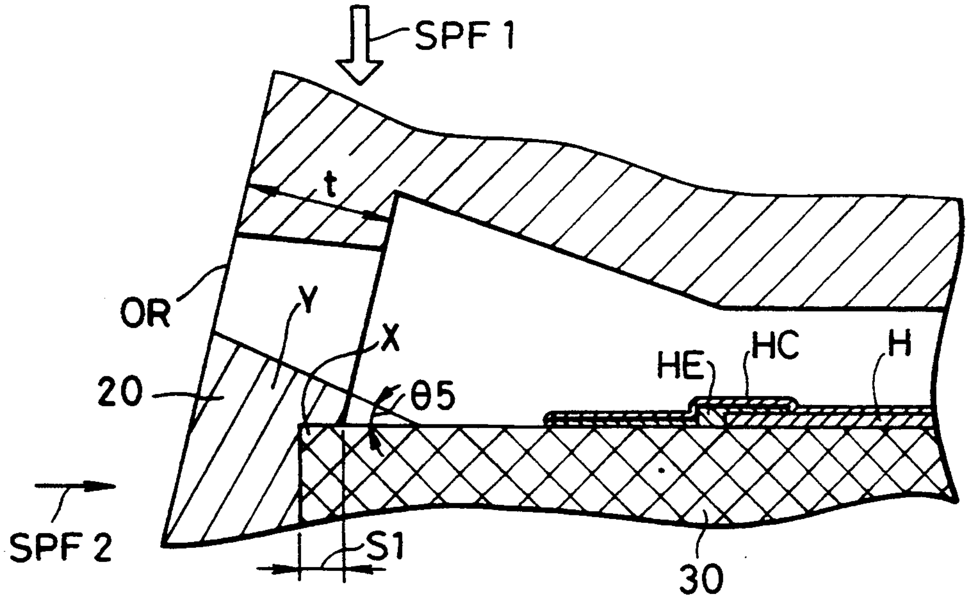
FIG. 16 is an enlarged view of the orifice portion of FIG. 15.

FIGS. 12 to 14 are illustrations of an embodiment to explain the structure of the orifice defining member 20 which is integrally formed with a top plate, hearing a liquid chamber CE and liquid passages, for reinforcing the member 20. FIG. 12 is a rear view of the orifice defining member 20, FIG. 13 a bottom view, and FIG. 14 a front view, respectively. FIG. 15 is an enlarged sectional view taken along one of the liquid passages of a liquid jet unit using the orifice defining member of FIGS. 12 to 14. FIG. 16 is an enlarged view of the orifice portion of FIG. 15. With reference to FIGS. 12 to 16, conditions of the thickness of the orifice defining member 20, mating relation of the orifice defining member 20 to the heater board 30, joining or bonding of the orifice defining member 20 and the heater board 30 will be described.

In FIG. 14, the orifice defining member 20 is provided at an orifice existing region ORE with 128 orifices (not shown because of fineness) substantially aligned straight for performing recording at 400 dpi. Each orifice has a substantially equal leg trapezoidal cross-section with curved corners having a radius of curvature R1 = R2 = 4.7 μm between 4 to 9 μm as mentioned in Table 2Although stress concentration is liable to take place when the number of orifices increase in a high density orifice arrangement or orifice existing region, the specific cross-sectional shape of the orifices according to the present invention provides a considerable crack reducing effect.

The embodiment, shown in FIGS. 12 to 14, has various features which enhance fabrication accuracy of the head, liquid discharging characteristics, positioning accuracy between the heater board 30 and the orifice defining member 20. Although these features structures cause novel problems which have been recognized in this application it becomes possible to effectively and surely use such structures by employing the above mentioned shapes of the orifices. The first featured structure is that a recess (see FIG. 15) is formed in the vicinity of the orifice existing region ORE as shown in FIG. 14. The recess is formed in a region where two different inclined plane OP2 and OP3 continuously intersect. Although this recess enhances liquid discharging performance of the orifices and the cleaning effect of the face of discharging orifice the recess is likely to cause stress concentration. The second features structure is that bonding regions 70 of the heater board 30 and the top plate of the orifice defining member 20 are provided to end portions of the top plate away from the orifice region. As clearly shown in FIGS. 12 and 13, the bonding regions 70 are provided to the opposite end portions of the top plate except the central portion thereof with many adhesive placing grooves 71 arranged along an array of the orifices. The heater board 30 and the orifice defining member 20 are strongly bonded at the bonding regions 70, and stress concentration is liable to take place partially since there is produced the relative difference in resilient pressurization between the bonding regions and the mating portion which will be described hereinafter. Although this structure particularly causes large fluctuation to changes in temperature, it is advantageous in temporary holding the positioning portion 60 and the surface of the heater board 30 and is preferable for accurately positioning the mating portion. The stress concentration is reduced by adopting shapes of the orifices of the preceding embodiments while the advantage of the accurate positioning is possessed.

In FIGS. 12 to 14, reference characters OPB designate the rear surface of the orifice defining member and OPF the front surface thereof. Reference numeral 50 indicates an ink inlet of the common liquid chamber CE. To enhance both suction recovery characteristics from the orifices and ink feed characteristics the common liquid chamber CE is provided with inclined surfaces CE2 and CE2, as shown in FIGS. 13 and 14, and another inclined surface 121 as clearly shown in FIGS. 13 and 15.

As will be understood from FIG. 15, the common liquid chamber CE includes a cross-sectional area increasing region Z and the inclined surface 121, the region Z communicating to the liquid passages 21. An extension line of the inclined surface 121 reaches a surface position Po on the substrate 30 as a heater board on which ejection energy generating means H of liquid passages are arranged. In this embodiment, the inclined surface 121 meets the central line C2 of each ink passage 21 and the extension line thereof at an angle of 22 degrees whereas the inclined surface 121 makes 15 degrees with both inclined surfaces CE2 and CE2 shown in FIGS. 14 and 15.

The region Z is capable of not only collecting fine bubbles, but also holding the collected bubbles at the location away from the liquid passages in which ejection energy generating means H are located, and hence collected bubbles are guided along the inclined surface and away from the liquid passages, so that generation of poor recording is greatly delayed.

In FIG. 15, reference numeral 141 designates a substantially equal leg trapezoidal shape of one of the liquid passages on the orifice plate side in vertical axial-section, 111 a substantially equal leg trapezoidal inner opening of the one orifice, and OR a substantially equal leg trapezoidal outer opening of the one orifice. In this embodiment, the ink feed passages from the liquid passages to the orifice defining member have an equal leg trapezoidal cross-section. That is, the liquid passages have an equal leg trapezoidal cross-section with the ejection energy generating means placed on the base side thereof, and a condition to disperse bubbles produced over the whole inner surface of each liquid passage is made non-uniform. This causes bubbles produced or entered to be collected on the shorter side of each of the trapezoidal liquid passages, and moreover the discharging roots of bubbles can be concentrated in a recovery state. Thus, bubble discharge effect is considerably improved. As shown in FIGS. 1 and 3 orifices which correspond to trapezoidal liquid passages may have a shorter side in the side of the shorter side of the corresponding liquid passages, and a longer side in the side of the longer side thereof. In this case, ink turbulence is prevented from taking place in a recovery state, and bubble discharge effect is stabilized. Most preferably, the cross-sections of the liquid passages and the orifices have equal leg trapezoidal shapes. In this embodiment, there are provided a first region (liquid passage from the line P1 to the inner opening 141, 111) and a second region (orifice). Each of the first regions is provided to the discharge portion of the corresponding liquid passage and has an enlarged equal leg trapezoidal cross-section, and hence the liquid passage has an enlarged cross-sectional area at the first region. Each of the second regions has a smaller cross-sectional area than the corresponding first region and has a subsonically equal leg trapezoidal cross-section. The second region has a substantially equal leg trapezoidal outer opening OR with curved corners previously explained. With such a construction, bubbles are positively removed without producing ink turbulence.

In this embodiment, the first and second regions are symmetrical with respect to a plane (including the lines C1 and C2 in FIG. 15) which is formed by connecting middle points of legs of the equal leg trapezoid of each liquid passage, and pressure distribution applied in a recovery state is made uniform, so that small turbulences are greatly reduced in discharge regions. It is to be noted that an extension line of the line C1 reaches a point P3 on the corresponding heat generating element H, so that ejection energy is efficiently used for ejection.

In the present invention a simple construction including a liquid passage defining member and a pressurizing member may be adopted. The liquid passage defining member is formed by integrally forming a top plate member, which defines a common liquid chamber, with an orifice defining member. The liquid passage defining member is provided with a stepped portion for engaging with a substrate. The pressurizing member holds the liquid passage defining member under pressure against the shoulder portion of the substrate by applying line pressure from above the liquid passages of the liquid passage defining member in the arrangement direction of the liquid passages. The distal end of the substrate is held in a position to engage with the stepped portion. Such a simple construction is capable of achieving excellent recording with little disadvantage previously described due to production of bubbles.

In this embodiment, the front surface of the orifice plate is formed with differently inclined surfaces OP1, OP2 and OP3 (inflection points J and I). The planar orifice defining member 20 has a vertical section with gentle slopes on the side of the outer opening of the orifice OR, in wiping cleaning is positively carried out without mounting a special part to the cap, and in capping a meniscus of ink in the orifices is prevented from retarding. Thus, poor ejection of ink and various problems due to poor ejection can be overcome in an excellent manner by the simple construction.

In FIG. 15, the height of the region Z is preferably equal to or smaller than that of the liquid passages. In FIG. 15 the angle $\theta 3$, which is formed by the region Z, is 10°, and is preferably not larger than half of the angle $\theta 4$ of the inclined surface 121.

Referring to the enlarged view of FIG. 16, the liquid jet unit will be described. A first noticed structure of this embodiment is that a recess portion is formed in the orifice defining member in the vicinity of orifices. The heater board 30 engages at an edge thereof with the recessed portion. Secondly, to hold this mating, the engaging portions are pressurized in at least on direction or in different directions by means of a resilient pressurizing mechanism (such as a spring member not shown). Thirdly, the orifice defining member has a thickness smaller than 60 μm. These structures make the head stable in ejection characteristic, and reduce drawbacks such as entering of an unnecessary adhesive into liquid, and the liquid passages, orifices and outer openings of orifices are prevented from being deformed. On the contrary, these structures have a tendency to increase cracks due to stress concentration. In the case where an adhesive is used in the liquid passage defining portions, liquid resistance and thermal fluctuation factors of the adhesive itself, such as thermal expansion coefficient and production of cracks, become significant. The above features satisfy requirements to remove causes of such drawbacks. These features satisfy structural accuracy by producing stress concentration in the vicinity of orifices or outer openings thereof. The specific shape of orifices of the present invention provides remarkable effects to each of the features or a combination of thereof, and enables a liquid jet unit having the features to be realized.

These features are particularly effective for a head with many (more than 128) orifices or orifices arranged at 400 dpi, and enables the previously described specific shape of orifices to perform very fine recording.

As clearly understood from FIGS. 15 and 16, the first feature is that a recess Y is provided in the orifice defining member 20 so that the recess can accurately engage with the edge or shoulder X of the heater board 30. The upper end of this engagement is placed in the vicinity of the base side of the trapezoidal orifices, and hence stress concentration due to this becomes a trigger of production of cracks. At the same time this engagement structure deteriorates strength of the orifice defining member, and is likely to make the degree of thermal expansion and contraction to thermal fluctuation relatively large. For these reasons, the substantial polygonal section of orifices OR with curved corners becomes important to provide stable ejection for a long term, possessing the advantages of the first feature. In this case, preferably R1 = R2, and R1 is 4 μm to 9 μm.

The second feature is that as shown in FIG. 16, first resilient pressure SPF1 and second resilient pressure SPF2 are applied to respective surfaces of the edge X of the heater board 30. According to this structure, a large stress concentration is generated in the vicinity of the orifices, and is liable to become a significant cause of cracks for high density arrangement of the orifices. Also for the second feature, the specific cross-sectional shape of the orifices is effective. Conventional various pressurizing mechanisms which are referred to as pressurizing means in the specification may be used for applying the resilient forces.

The third feature relates to the thickness t of the orifice defining member in the direction of orifices. When the thickness t excessively increases, secondary liquid passage may be formed, and hence ejection efficiency of the discharging element is deteriorated. On the other hand, the orifice defining member is degraded in strength when the thickness thereof is shortened. In view of the above, the thickness t is 45 μm in the embodiment, and preferably 20 μm to 50 μm. Stress concentration is liable to be produced in the vicinity of the orifices of the orifice defining member as the thickness becomes smaller. In such a case the shape of the orifices of the present invention is therefore effective.

In FIG. 16, reference character H indicates an electric resistance, HE an electrode for supplying electric signals to the resistance H, and HC a protection layer for insulation protecting the resistance H and the electrode HE from liquid. $\theta 5$, is a convergent angle of the orifice, is 9° while the laser incident angle $\theta$ of 10°. Reference character S1 indicates a length over which the orifice defining member 20 is placed on the heater board 30 and is 15 μm. The length S1 may be 10 to 20 μm, preferably 15 μm or larger. When the length S1 is converted to a length in the thickness wise direction of the orifice defining member, 10 to 15 μm is preferable for excellent engagement of the orifice defining member 20 and the common liquid chamber 30. It is preferable to enlarge the length S1 as the number of orifices increases.

Figure 17:
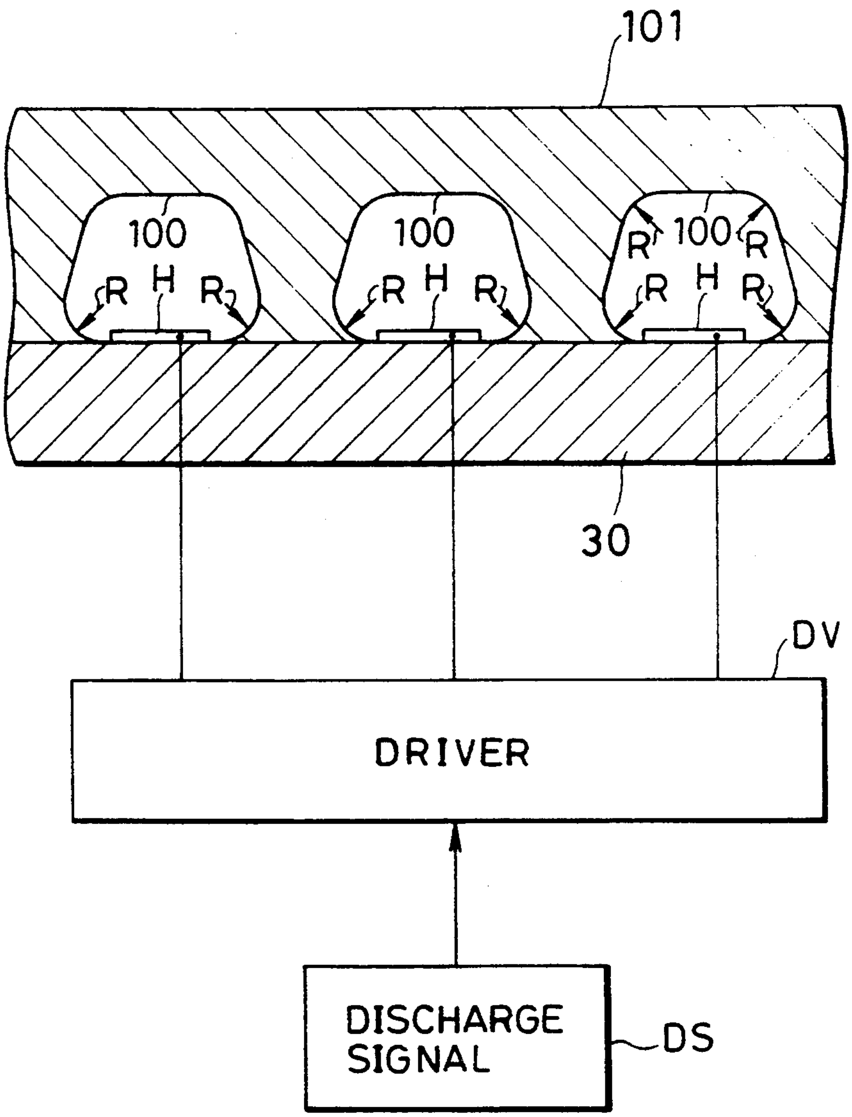
FIG. 17 is a drive diagram including another embodiment of orifices of a liquid jet unit according to the present invention.

FIG. 17 illustrates a case where the present invention is applied to an ink jet head having orifices formed in joining edges. In this embodiment, polygonal grooves 100 having curved corners R are formed in a grooved top late 101 whereas the joining surface of the heater board 30 is substantially flat. When an adhesive is used in this embodiment, the adhesive is uniformly applied as compared to the conventional head, so that little amount of the adhesive enters into liquid passages. Moreover, separation of the adhesion and production of cracks are effectively prevented when stress concentration takes place since curved portions are formed in the top plate 101. The radius of curvature of the curved portions is preferably the value previously mentioned. Reference character H indicates electrothermal converting-elements.

In FIG. 17, a driver DV for driving the electrothermal converting-elements H is shown in block, and includes units which supply electric signals for generating film boiling in the liquid by driving the electrothermal converting-elements H in response to discharge signals DS.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling point so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A liquid jet unit comprising:

a plurality of discharging portions, said discharging portions each including an orifice, having an outer and an inner opening, and a liquid passage communicating with said inner opening of said orifice, each said orifice being substantially polygonal in cross-section, said plurality of discharging portions further including an orifice defining member which defines at least two sides of each said polygonal orifice; and ejection elements for supplying ejection energy to liquid contained in said liquid passages to eject liquid through said polygonal orifices, wherein said orifice defining member includes a curved portion at a position corresponding to a corner of an outer opening of at least one polygonal orifice, said corner defining an area which is closest to an adjacent polygonal orifice.

2. A liquid jet unit as claimed in claim 1, wherein said orifice defining member comprises a covering member forming at least a part of said liquid passages, said covering member and said orifice defining member being molded of resin in one piece, thereby constructing a resin member.

3. A liquid jet unit as claimed in claim 2, further comprising a supporting member including said ejection elements thereon, and wherein said resin member comprises an engaging portion formed adjacent to the polygonal orifices on a side for engaging the supporting member.

4. A liquid jet unit as claimed in claim 3, further comprising pressing means for resiliently holding the orifice defining member and the supporting member into engagement to each other, and wherein said ejection elements are electrothermal converting-elements for generating film boiling in the liquid; and said resin member and said supporting member are bonded to each other at a location away from the engaging portion.

5. A liquid jet unit as claimed in claim 4, wherein the curved portion has a radius of curvature 2 μm to 12 μm.

6. A liquid jet unit as claimed in claim 5, wherein said resin member as a thickness no greater than 60 μm at a position where said polygonal orifices formed;

each of said polygonal orifices has an area from 300 $\mu m^2$ to 450 $\mu m^2$;

a radius of curvature of said curved portion is from 4 μm to 9 μm; and said polygonal orifices are arranged for performing recording at a density of at least 400 dpi.

7. A liquid jet unit as claimed in claim 6, wherein said engaging portion has a length of at least 10 μm in a liquid ejection direction of the polygonal orifices.

8. A liquid jet unit comprising:

a plurality of discharging portions, said discharging portions each including an orifice, having an outer and an inner opening, and a liquid passage communicating with said inner opening of said orifice, each said orifice being substantially polygonal in cross-section, said plurality of discharging member made of a resin material which defines at least two sides of each said polygonal orifice; and ejection elements for supplying ejection energy to liquid contained in said liquid passages to eject liquid through said polygonal orifices, wherein said orifice defining member includes curved portions, having a radius of curvature from 2 μm to 12 μm, at positions corresponding to a corner of an outer opening of said polygonal orifices.

9. A liquid jet unit as claimed in claim 8, wherein:

said orifice defining member has a thickness no greater than 60 μm at a position where said polygonal orifices are formed; and said curved portions of said polygonal orifices continuously increase in radius of curvature from said outer opening toward said inner opening.

10. A liquid jet unit as claimed in claim 8, further comprising a supporting member having said ejection elements thereon, and wherein said resin member includes an engaging portion formed adjacent to said polygonal orifices on a side for engaging the supporting member; and said resin member further includes curved portions having a radius of curvature at least 4 μm on the side of the engaging portion.

11. A liquid jet unit as claimed in claim 10, wherein the engaging portion has a length of at least 10 μm in a liquid ejection direction of the polygonal orifices.

12. A liquid jet unit as claimed in claim 11, wherein:

said ejection elements are electrothermal converting-elements for generating film boiling in the liquid; and said resin member and said supporting member are bonded to each other at a location away from the engaging portion.

13. A liquid jet unit as claimed in claim 8, wherein:

said ejection elements are electrothermal converting-elements for generating film boiling in the liquid; and said resin member and said supporting member are bonded to each other at a location away from the engaging portion.

14. A liquid jet unit as claimed in claim 8, wherein:

said ejection elements are electrothermal converting-elements for generating film boiling in the liquid; and the polygonal orifices are arranged for recording at a density of at least 400 dpi.

15. A liquid jet unit as claimed in claim 8, wherein:

said orifice defining member further defines walls forming recesses corresponding to said liquid passages communicating with said polygonal orifices;

said orifice defining member has a thickness no greater than 60 μm at a position where the polygonal orifices are formed;

said curved portion of each of said polygonal orifices continuously increases in radius of curvature from said outer opening toward said inner opening; and said curved portion has a radius of curvature from 8 μm to 16 μm at said inner opening.

16. An orifice defining member for a liquid jet unit, said orifice defining member being made of a resin material as a single piece to define at least two sides of each of a plurality of substantially polygonal orifices, each polygonal orifice having an outer and inner opening and walls forming recesses corresponding to liquid passages which communicate with said polygonal orifices, respectively, said orifice defining member comprising:

curved portions having a radius of curvature from 2 μm to 12 μm at positions corresponding to a corner of an outer opening of said polygonal orifices, wherein said orifice defining member has a thickness no greater than 60 μm at a position where the polygonal orifices are formed, and wherein said polygonal orifices are formed so that said radius of curvature continuously increases toward the corresponding liquid passage.

17. An orifice defining member for a liquid jet unit as claimed in claim 16, wherein the radius of curvature is from 8 μm to 16 μm at the inner opening of each of said polygonal orifices.

18. A liquid jet recording apparatus comprising:

a liquid jet unit which comprises:

a plurality of discharging portions, said discharging portions each including an orifice, with an outer and an inner opening, and a liquid passage communicating with said inner opening of said orifice, each said orifice being substantially polygonal in cross-section, said plurality of discharging portions further including an orifice defining member made of a resin material which defines at least two sides of each said polygonal orifice, said orifice defining member including curved portions having a radius of curvature from 2 μm to 12 μm at positions corresponding to a corner of said outer opening of said polygonal orifices, said curved portion of each of said polygonal orifices being continuously increased in radius of curvature from said outer opening toward the liquid passages communicating with said inner opening; and electrothermal converting-elements for generating film boiling in liquid contained in respective liquid passages, wherein said polygonal orifices are arranged for recording at a density of at lest 400 dpi;

a transporting mechanism for transporting a recording medium on which recording is carried out using ejected liquid; and drive means for supplying drive signals to said electrothermal converting-elements in response to a recording signal.

19. A liquid jet recording apparatus as claimed in claim 18, further comprising a supporting member having said electrothermal converting-elements thereon, wherein said orifice defining member comprises an engaging portion formed adjacent to said polygonal orifices on a side for engaging the supporting member, and wherein said orifice defining member and said supporting member are bonded to each other at a location away from the engaging portion.

20. A liquid jet recording apparatus as claimed in claim 19, wherein said orifice defining member further define walls forming recesses corresponding to the liquid passages communicating with said polygonal orifices, wherein said member has a thickness no greater than 60 μm at a position where the polygonal orifices are formed, and wherein the radius of curvature of the curved portions are from 8 μm to 16 μm at said inner opening of each of said polygonal orifices.

21. An ink jet head comprising:

an orifice defining member; and a top plate, wherein said orifice defining member and said top plate are integrally molded of a resin material, said orifice defining member including a plurality of ink discharging orifices formed therethrough between first and second sides of said orifice defining member, said top plate having groove portions defining respective liquid passages for communicating with the ink discharging orifices at the first side of the orifice defining member and for ejecting ink through the ink discharging orifices, wherein said ink discharging orifices are formed through the orifice defining member by illuminating the orifice defining member with a laser beam from the first side, and herein the ink discharging orifices are tapered, from the first side of the orifice defining member toward the second side thereof, said ink discharging orifices including opposite bottom corners, each having a curved surface.

22. An ink jet head as claimed in claim 21, further comprising an electrothermal transducer, arranged in each of the liquid passages corresponding to respective ink discharging orifices, for generating thermal energy to discharge ink, whereby bubbles are produced in ink in the ink discharging orifices by using heat generated from the electrothermal transducer for discharging ink.

23. An ink jet recording apparatus comprising:

an ink jet head in which an orifice defining member and a top plate are integrally molded of a resin material, said orifice defining member including a plurality of ink discharging orifices formed therethrough between first and second sides of said orifice defining member, said top plate having groove portions defining respective liquid passages for communicating with the ink discharging orifices at the first side of the orifice defining member and for ejecting ink through the ink discharging orifices, wherein said ink discharging orifices are formed through the orifice defining member by illuminating the orifice defining member with a laser beam from the first side and wherein the ink discharging orifices are tapered, from the first side of the orifice defining member toward the second side thereof, said ink discharging orifices including opposite bottom corners, each having a curved surface; and a carriage mounting the ink jet head thereon, whereby ink is ejected selectively from the ink discharging orifices of the ink jet head against a recording medium for recording during traveling of the carriage along the recording medium.

24. An ink jet recording apparatus according to claim 23, further comprising an electrothermal transducer, arranged in each of the liquid passages corresponding to respective ink discharging orifices, for generating thermal energy to discharge ink, whereby bubbles are produced in ink in the ink discharging orifices by using heat generated from the electrothermal transducer for discharging ink.

25. A liquid jet recording apparatus, comprising:

a liquid jet unit which comprises:

a plurality of discharging portions, said discharging portions each including an orifice, having an outer and an inner opening, and a liquid passage communicating with said inner opening of said orifice, each said orifice being substantially polygonal in cross-section, said plurality of discharging portions further including an orifice defining member which defines at least two sides of each said polygonal orifice;

ejection elements for supplying ejection energy to liquid contained in said liquid passages to eject liquid through said polygonal orifices, wherein said orifice defining member includes a curved portion at a position corresponding to a corner of an outer opening of at least one polygonal orifice, said corner defining an area which is closest to an adjacent polygonal orifice;

a carriage mounting said liquid jet unit thereon;

means for relatively moving said liquid jet unit and a recording medium on which recording is carried out by liquid ejected from said liquid jet unit; and means for driving said ejection elements in response to a recording signal.

* * * * *

UNITED STATES PATENT AND TRADEMARK OFFICE
CERTIFICATE OF CORRECTION

PATENT NO. : 5,361,087

DATED : November 1, 1994

INVENTOR(S) : HIROKI TAJIMA, ET AL.

It is certified that error appears in the above-identified patent and that said Letters Patent is hereby corrected as shown below:

ON TITLE PAGE

In [56] References Cited, under U.S. PATENT DOCUMENTS: "Wantanabe" should read --Watanabe--.

COLUMN 1

Line 21, "bene" should read --been--.
Line 55, "orifices. 1." should read --orifices. ¶ 1.--.
Line 66, "directions. 2." should read --directions. ¶ 2.--.

COLUMN 2

Line 2, "NO." should read --No.--.
Line 3, "condition. 3." should read --condition. ¶ 3.--.
Line 37, "heads either." should read --heads.--.
Line 38, "had" should read --either had--.

COLUMN 3

Line 49, "orifice" should read --orifices-- and "200 $\mu m^2$" should read --300 $\mu m^2$--.

COLUMN 4

Line 17, "4 µm on" should read --4 µm at--.
Line 52, "orifices" should read --orifice--.

COLUMN 6

Line 67, "designated" should read --designates--.

UNITED STATES PATENT AND TRADEMARK OFFICE

CERTIFICATE OF CORRECTION

PATENT NO. : 5,361,087

DATED : November 1, 1994

INVENTOR(S) : HIROKI TAJIMA, ET AL.

It is certified that error appears in the above-identified patent and that said Letters Patent is hereby corrected as shown below:

COLUMN 7

Line 28, "god" should read --good--.
Line 37, "35 ms)" should read --35 ns)--.
Line 38, "exiting" should read --exciting--.
Line 57, "CO2" should read --$CO_2$--.
Line 59, "CO2" should read --$CO_2$-- and "carters" should read --craters--.
Line 62, "cimalaser" should read --cimalaser,--.

COLUMN 8

Line 10, "trapezoidal," should read --trapezoid,--.
Line 41, "to plate 22" should read --top plate 22--.
Line 65, "against" should be deleted.

COLUMN 9

Line 14, "8 hour," should read --8-hour--.

COLUMN 10

Line 56, "referable" should read --preferable--.

COLUMN 11

Line 65, "passage 2." should read --passages 2.--.

COLUMN 12

Line 55, "hearing" should read --bearing--.

UNITED STATES PATENT AND TRADEMARK OFFICE

CERTIFICATE OF CORRECTION

PATENT NO. : 5,361,087

DATED : November 1, 1994

INVENTOR(S) : HIROKI TAJIMA, ET AL.

It is certified that error appears in the above-identified patent and that said Letters Patent is hereby corrected as shown below:

COLUMN 13

Line 8, "Table 2Although" should read --Table 2. Although--.
Line 18, "features" should read --featured--.
Line 26, "plane OP2" should read --planes OP2--.
Line 30, "features" should read --featured--.

COLUMN 14

Line 49, "subsoni-" should read --substantially--.
Line 50, "cally" should be deleted.

COLUMN 15

Line 37, "on" should read --one--.
Line 58, "of" should be deleted.

COLUMN 16

Line 41, "is" should be deleted.
Line 47, "thickness wise" should read --thicknesswise--.
Line 57, "late 101" should read --plate 101--.

COLUMN 17

Line 28, "the" (first occurrence) should be deleted.

COLUMN 18

Line 3, "As examples" should read --Examples-- and "system," should read --system--.

UNITED STATES PATENT AND TRADEMARK OFFICE
CERTIFICATE OF CORRECTION

PATENT NO. : 5,361,087

DATED : November 1, 1994

INVENTOR(S) : HIROKI TAJIMA, ET AL.

It is certified that error appears in the above-identified patent and that said Letters Patent is hereby corrected as shown below:

COLUMN 19

Line 10, "as" should read --has--.
Line 12, "formed;" should read --are formed;--.
Line 29, "discharging member" should read --discharging portions further including an orifice defining member--.

COLUMN 20

Line 26, "and inner" should read --an inner--.
Line 68, "lest" should read --least--.

COLUMN 21

Line 44, "herein" should read --wherein--.

Signed and Sealed this

Ninth Day of May, 1995

Attest:

BRUCE LEHMAN

Attesting Officer

Commissioner of Patents and Trademarks